UNITED STATES PATENT OFFICE.

HEINRICH JORDAN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

AZO DYESTUFFS.

1,097,231. Specification of Letters Patent. Patented May 19, 1914.

No Drawing. Application filed April 16, 1913. Serial No. 761,477.

*To all whom it may concern:*

Be it known that we, HEINRICH JORDAN and WILHELM NEELMEIER, doctors of philosophy, chemists, citizens of the German Empire, residing at Leverkusen, near Cologne-on-the-Rhine, Germany, have invented new and useful Improvements in Azo Dyestuffs, of which the following is a specification.

We have found that new and valuable azo dyestuffs can be obtained by combining the diazo compounds prepared from aminoacidylaminosalicylic acid compounds, such as meta-aminobenzoyl-para-amino-sulfo-salicylic acid, (OH,COOH:1.2)

para-amino-tolyl-sulfonyl-para-amino-salicylic acid, (OH,COOH:1.2)

amino-benzoylamino-cresotinic acids, chloro- and methoxy-amino-benzoyl-amino-salicylic acids with azo dyestuff components *e. g.* naphthol sulfonic acids, aminonaphthol sulfonic acids, acetylaminonaphthol sulfonic acid, pyrazolon compounds, dioxyquinolin, etc. The new dyes are after being dried and pulverized in the shape of their alkaline salts dark powders soluble in water generally with a yellow to red to bluish-red coloration and in concentrated sulfuric acid with a red to bluish-red coloration and yielding upon reduction with acetic acid and zinc powder an aminoacidylaminosalicylic acid compound and an amin.

From yellow to red to violet chrome lakes fast to chlorin and soap can be produced on the fiber with the new coloring matters.

In order to illustrate the new process more fully the following example is given, the parts being by weight: 30.2 parts of meta-amino-anisoyl-para-aminosalicylic acid having the formula:

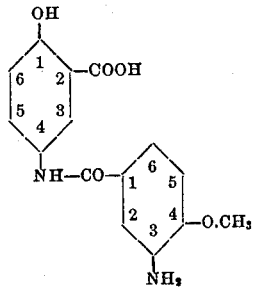

are dissolved in 1000 parts of water and 53 parts of soda, reprecipitated with 30 parts of hydrochloric acid (19½° Bé.) and diazotized with 6.9 parts of sodium nitrite in 10 parts of water at 20–25° C. The diazo compound thus obtained is then stirred into a cold solution of 24.6 parts of the sodium salt of 1-naphthol-4-sulfonic acid and a soda solution is added to obtain a weakly alkaline reaction. After stirring the combination is soon complete and the dyestuff is salted out and filtered off. It is after being dried and pulverized in the shape of its sodium salt a dark powder soluble in water with a yellow-red coloration and in concentrated sulfuric acid with a red-blue coloration; and yielding upon reduction with zinc powder and acetic acid amino-anisoyl-para-amino-salicylic acid and 2-amino-1-oxy-naphthalene-4-sulfonic acid. It has in a free state most probably the formula:

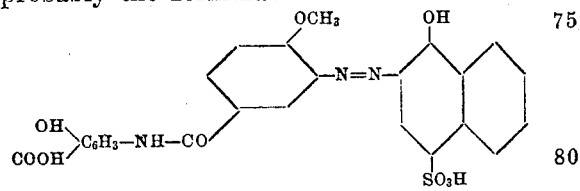

When printed with acetate of chromium on the fiber a pure scarlet-red shade is obtained fast to chlorin and to soap.

We claim:—

1. The herein described new azo dyestuffs derived from diazo compounds of aminoacidyl-aminosalicylic acid compounds and azo dyestuff components, which are after being dried and pulverized in the shape of their alkaline salts dark powders soluble in water generally with a yellow to red to bluish-red coloration and in concentrated sulfuric acid with a red to blue-red coloration; yielding upon reduction with acetic acid and zinc powder an aminoacidylaminosalicylic acid compound and an amin; and furnishing on the fiber from yellow to red to violet chrome lakes fast to chlorin and to soap, substantially as described.

2. The hereindescribed new azo dyestuffs derived from diazo compounds of aminoarylcarbonyl-aminosalicylic acid compounds and azo dyestuff components, which are after being dried and pulverized in the shape of their alkaline salts dark powders soluble in water generally with a yellow to red to bluish-red coloration and in concentrated sulfuric acid with a red to blue-red coloration; yielding upon reduction with acetic acid and zinc powder an aminobenzoyl-aminosalicylic acid compound and an amin; and furnishing on the fiber from yellow to red to violet chrome lakes fast to chlorin and to soap, substantially as described.

3. The hereindescribed new azo dyestuffs derived from azo compounds of aminoacidyl-para-aminosalicylic acid (OH,COOH:1,2)

compounds and azo dyestuff components, which are after being dried and pulverized in the shape of their alkaline salts dark powders soluble in water generally with a yellow to red to bluish-red coloration and in concentrated sulfuric acid with a red to blue-red coloration; yielding upon reduction with acetic acid and zinc powder an aminoacidylparaaminosalicylic acid (OH,COOH:1,2)

compound and an amin; and furnishing on the fiber from yellow to red to violet chrome lakes fast to chlorin and to soap, substantially as described.

4. The herein described new azo dyestuffs derived from diazo compounds of aminoacidyl-aminosalicylic acid compounds and naphthol sulfonic acids, which are after being dried and pulverized in the shape of their alkaline salts dark powders soluble in water generally with a yellow to red to bluish-red coloration; yielding upon reduction with acetic acid and zinc powder an aminoacidylaminosalicylic acid compound and an aminonaphthol sulfonic acid; and furnishing on the fiber from yellow to red to violet chrome lakes fast to chlorin and to soap, substantially as described.

5. The herein described new azo dyestuffs derived from diazo compounds of amino-arylcarbonyl-aminosalicylic acid compounds and naphthol sulfonic acids, which are after being dried and pulverized in the shape of their alkaline salts dark powders soluble in water generally with a yellow to red to bluish-red coloration and in concentrated sulfuric acid with a red to blue-red coloration; yielding upon reduction with acetic acid and zinc powder an aminobenzoyl-aminosalicylic acid compound and an aminonaphthol sulfonic acid; and furnishing on the fiber from yellow to red to violet chrome lakes fast to chlorin and to soap, substantially as described.

6. The herein described new azo dyestuffs derived from diazo compounds of aminoacidyl-para-aminosalicylic acid (OH,COOH:1,2)

compounds and naphthol sulfonic acids, which are after being dried and pulverized in the shape of their alkaline salts dark powders soluble in water generally with a yellow to red to bluish-red coloration and in concentrated sulfuric acid with a red to blue-red coloration; yielding upon reduction with acetic acid and zinc powder an aminoacidyl-para-aminosalicylic acid (OH,COOH:1,2)

compound and an aminonaphthol sulfonic acid; and furnishing on the fiber from yellow to red to violet chrome lakes fast to chlorin and to soap, substantially as described.

7. The herein described new azo dyestuff having in a free state most probably the formula:

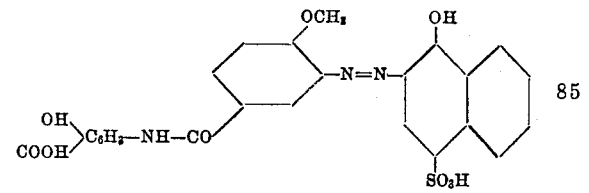

which is after being dried and pulverized in the shape of its sodium salt a dark powder soluble in water with a yellow-red coloration and in concentrated sulfuric acid with a red-blue coloration; yielding upon reduction with zinc powder and acetic acid amino-anisoyl-para-amino-salicylic acid and 2-amino-1-oxynaphthalin-4-sulfonic acid; furnishing when printed on the fiber with acetate of chromium scarlet-red shades fast to chlorin and to soap, substantially as described.

In testimony whereof we have hereunto set our hands in the presence of two subscribing witnesses.

HEINRICH JORDAN. [L. S.]
WILHELM NEELMEIER. [L. S.]

Witnesses:
 DORA NUFER,
 HELEN NUFER.